United States Patent [19]
Moore

[11] Patent Number: 5,373,979
[45] Date of Patent: Dec. 20, 1994

[54] HANGER HOLDER ASSEMBLY

[75] Inventor: Norman T. Moore, Conway, S.C.

[73] Assignee: BN&T, Inc., Conway, S.C.

[21] Appl. No.: 140,505

[22] Filed: Oct. 25, 1993

[51] Int. Cl.$^5$ .......................... B60R 7/00; A47H 1/10
[52] U.S. Cl. .................. 224/42.46 A; 223/DIG. 4; 223/1; 224/42.45 R; 224/42.45 A; 224/42.46 R; 248/3.7; 248/339
[58] Field of Search ............... 224/42.46 A, 42.46, 224/42.45 R, 42.45 A; 223/85, DIG. 2, DIG. 4, 1; 211/87, 113, 119; 248/317, 339, 322, 304; D6/315

[56] References Cited

U.S. PATENT DOCUMENTS

| | | | |
|---|---|---|---|
| D. 160,790 | 11/1950 | Kongieser et al. | D4/436 |
| 178,247 | 6/1876 | Linscott | 248/214 |
| D. 279,450 | 7/1985 | Chap | D8/363 |
| D. 281,575 | 12/1985 | Chap | D8/363 |
| 888,032 | 5/1908 | Peterson | 211/87 |
| 2,157,001 | 5/1939 | Morley | 224/42.45 A |
| 2,500,881 | 3/1950 | Stader | 248/304 X |
| 2,547,222 | 4/1951 | Logan | 248/224.3 |
| 3,002,666 | 10/1961 | Silverman | 224/42.45 A |
| 3,900,110 | 8/1975 | Soroka | 248/317 |
| 4,863,081 | 9/1989 | Gabbert | 224/42.46 A |
| 5,104,083 | 4/1992 | Shannon | 224/42.46 |
| 5,181,683 | 1/1993 | Smith | 248/339 |

Primary Examiner—Clifford D. Crowder
Assistant Examiner—Bibhu Mohanty
Attorney, Agent, or Firm—Ralph Bailey

[57] ABSTRACT

A hanger holder assembly for carrying garments on coat hangers in an automotive vehicle has a receptacle (A) for removably receiving an upwardly extending post of a vehicle hanger bracket which is integrally mounted above a supporting side member (B) having a flat surface to aid in limiting rotation of the receptacle upon the post and for permitting a connecting side member (C) to extend downwardly therefrom supporting a horizontal hanger mounting bar (D) which is connected by a bracing member (E) to a junction with the connecting side member and the receptacle wherein the assembly is integrally molded of plastic material.

2 Claims, 2 Drawing Sheets

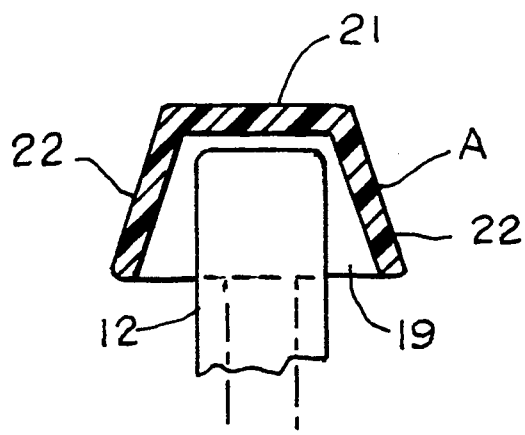
Fig. 3.
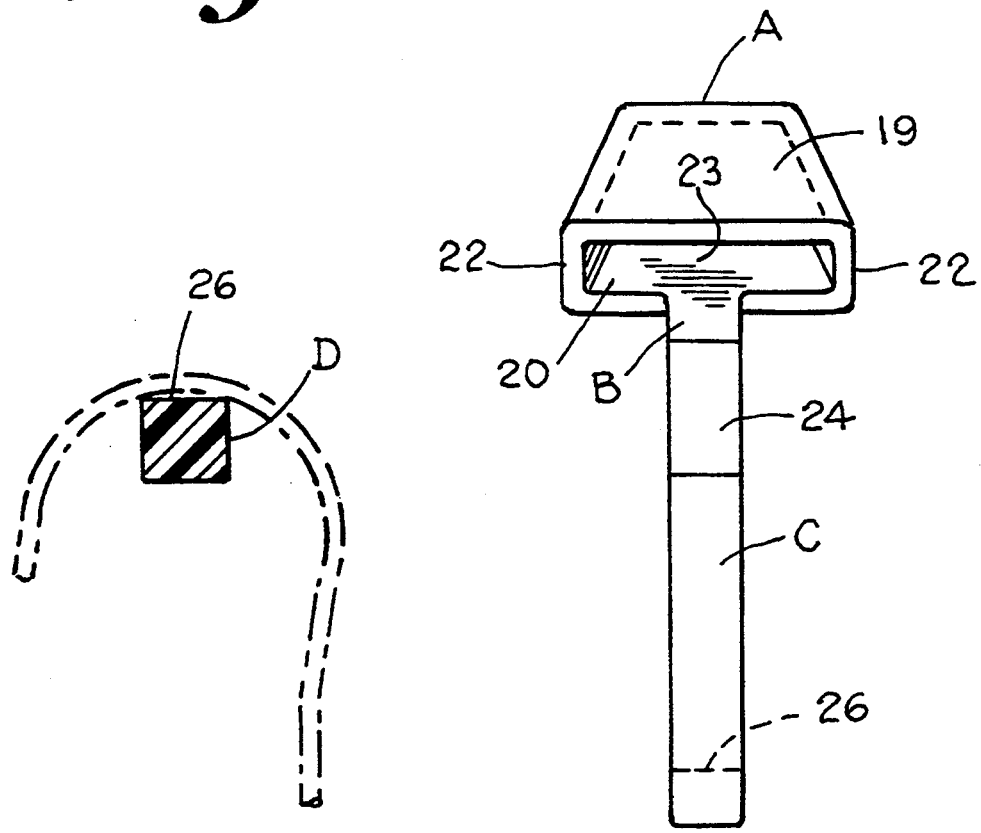
Fig. 4.
Fig. 5.

HANGER HOLDER ASSEMBLY

BACKGROUND OF THE INVENTION

This invention relates to a hanger holder assembly for suspending coat hangers for carrying garments in a vehicle on a bar extending outwardly from a side of the vehicle transversely of and partially across the vehicle.

Vehicles including automobiles, trucks and the like are often provided with hanger brackets attached to a side of a vehicle above a rear window for carrying an upwardly extending post for suspending a limited number, usually one, coat hanger therefrom as when bringing clothes home from the dry cleaners. When there are more coat hangers and clothes than can be accommodated by such hanger brackets, makeshift arrangements must be made such as placing the articles across the back seat or in the trunk where they often become wrinkled or soiled. The prior art includes a portable clothes hanger holder illustrated in U.S. Pat. No. 2,746,661. The hanger is of complicated construction and requires the use of a special post which is fitted into the window to support the hanger. U.S. Pat. No. 2,547,222 illustrates a hanger bracket for use on a door wherein the hanger bracket having a horizontal bar is suspended by a hook from an eye carried by a bracket extending over the top of the door. The hook has a flattened end to prevent rotation and a projecting member engaging the bracket for leveling the bar. Another hanger bracket is illustrated in U.S. Pat. Des. No. 279,450 for suspension as from a door. The state of the art is further illustrated by the following U.S. Pat. Nos.: Des. 160,790; Des. 281,575; 178,247; 2,595,521; 2,896,791; 3,825,127; 4,073,457; and 4,858,867.

It is desirable, therefore, to provide a hanger bar of limited length extending partially across an automotive vehicle for suspending coat hangers for carrying cleaning home from the dry cleaners and for increasing the capacity of the coat hanging facilities of an automotive vehicle.

SUMMARY OF THE INVENTION

Accordingly, it is an important object of the present invention to provide a hanger holder assembly which will provide a horizontal hanger mounting bar suspended from a hanger bracket attached to the side of the vehicle above the rear window and having an upwardly extending post thereon.

Another important object of the invention is to provide a hanger holder assembly for substantially increasing the coast hanger suspension capabilities of hanger brackets which are often attached to the vehicle for suspending a limited number of coat hangers carrying laundry above the rear window of the vehicle so as to avoid the necessity of piling cleaning on the seat or in the trunk of an automobile avoiding wrinkling and soiling of the garments as may result.

An important object of the invention is the provision of a hanger holder assembly including a transverse bar, and hanger having a receptacle for removably positioning the assembly upon an upwardly extending post carried by the hanger bracket of a vehicle wherein the assembly has a flat surface extending from the receptacle for engaging the hanger bracket for support and to avoid turning of the hanger holder assembly upon the hanger bracket of the vehicle.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a sectional elevation taken on the line 3—3 in FIG. 2;

FIG. 4 is a transverse sectional elevation taken on the line 4—4 in FIG. 2; and

FIG. 5 is a front elevation of a hanger holder assembly.

DESCRIPTION OF A PREFERRED EMBODIMENT

Figures 1, 2:
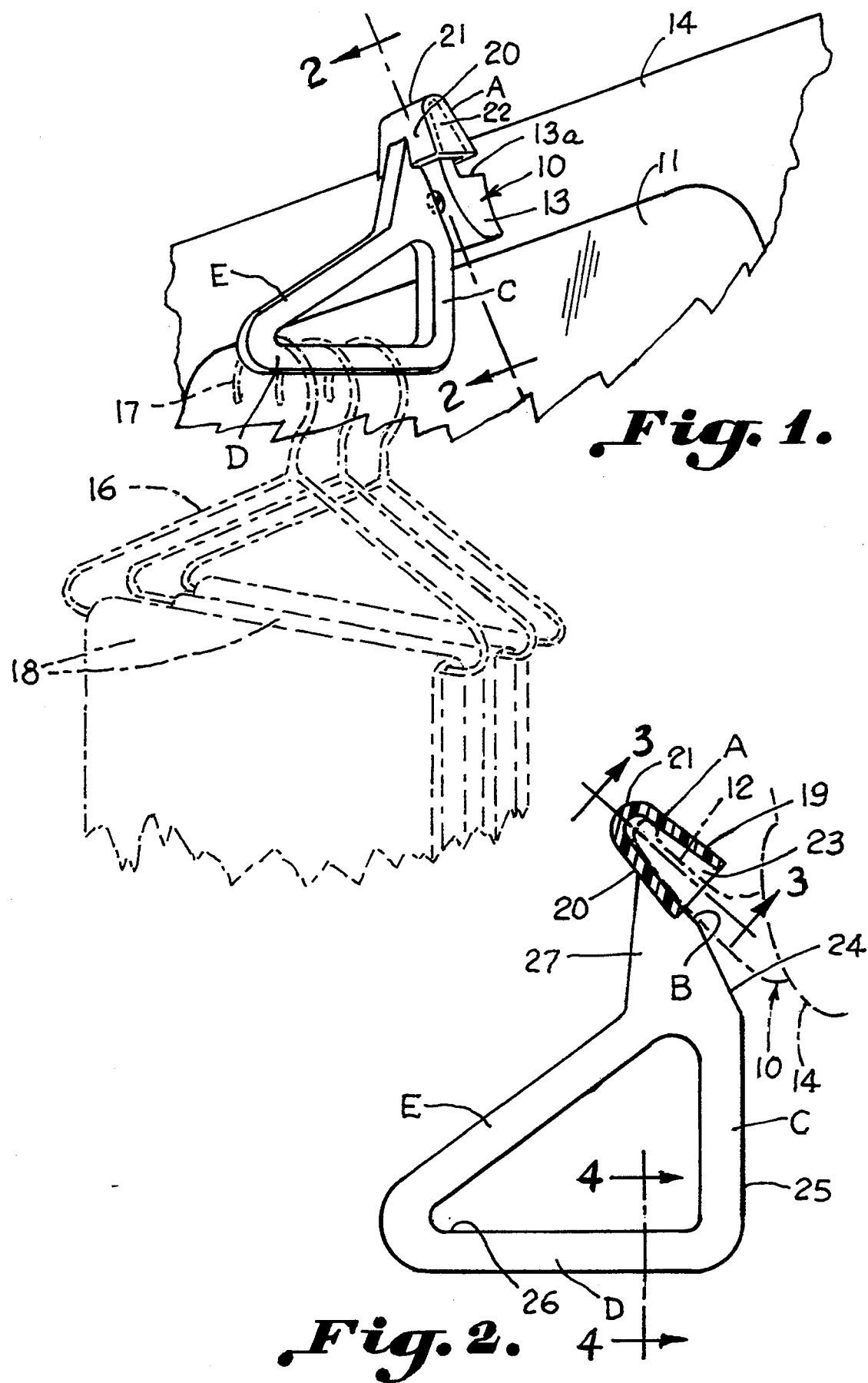
FIG. 1 is a perspective view illustrating a hanger; holder assembly constructed in accordance with the present invention suspended from the hanger bracket of a vehicle above the rear window carrying coat hangers with garments suspended therefrom.
FIG. 2 is an enlarged side elevation taken on the line 2—2 in FIG. 1 illustrating a receptacle for removably positioning the hanger holder assembly upon the hanger bracket.

The drawings illustrate a hanger holder assembly for suspending coat hangers carrying garments in an automotive vehicle having a hanger bracket attached to a side of the vehicle above a rear window carrying an upwardly extending post having a longitudinally elongated horizontal cross section on an outwardly spaced base support. A receptacle A removably positions the hanger holder assembly upon the upwardly extending post. An elongated longitudinal opening in the receptacle complementary to the cross section of the upright upwardly extending post for reception thereupon limits turning of the hanger holder assembly with respect to the post. A supporting side member B having a surface extending downwardly from an outer edge of the receptacle in inwardly spaced alignment therewith facilitates reception of the receptacle upon the post and projects outwardly for engagement with a supporting surface of the hanger bracket providing support further aiding in limiting turning of the assembly on the post. A connecting side member C is formed by an extension of the supporting side member projecting downwardly therefrom. A horizontal hanger mounting bar D is cantilevered outwardly from the side of the automotive vehicle so as to make the bar accessible for the suspension of coat hangers therefrom. An inclined bracing member E extends upwardly from a free end of the cantilevered mounting bar generally toward the receptacle forming a junction with said connecting side member. The assembly is molded integrally of plastic. Thus, a number of coat hangers and garments carried thereby may be suspended in alignment with the side of the vehicle.

A hanger bracket broadly designated at 10 is illustrated in FIGS. 1 and 2 as being attached above a rear window 11 of an automobile. The hanger bracket 10 has an upright post 12 carried on a base 13 which is outwardly spaced by a thickened rear portion 13a which is provided to space the post outwardly from the side 14 of the automobile, as for reception of the hooks of coat hangers. The hanger bracket is secured as by the screw 15 upon the side 14 of the automobile.

In FIG. 1 a plurality of coat hangers are illustrated in broken lines as at 16 having hooks 17 for suspending them from a hanger holder assembly constructed in accordance with the invention. The coat hangers 16 are illustrated as carrying garments such as pants 18 suspended from the coat hangers in longitudinal alignment with the automobile.

The receptacle A is illustrated as including upwardly and inwardly tapering front and rear walls 19 and 20 respectively having inner surfaces tapering upwardly and inwardly toward a closed top 21. The front and rear walls 19 and 20 are closed at their sides by side members 22 which taper upwardly and inwardly toward the closed top 21. The receptacle has an elongated longitudinal opening 23 for receiving the flat post 12 which has an elongated longitudinal disposed cross section which is received within the receptacle A in such a way as to limit turning of the receptacle upon the post 12.

The supporting side member E extends downwardly from the front lower portion of the receptacle A joining the receptacle at the front wall 20. The supporting side member B has a flat surface extending downwardly from an outer edge of the rear wall 20 of the receptacle in inwardly spaced alignment therewith to facilitate reception of the receptacle upon the post and to project outwardly into engagement with a supporting surface of the hanger bracket providing support further aiding and limiting turning of the assembly on the post. A connecting member C extends downwardly from the supporting side member and provides a flat front face 24 below the supporting side member B. The face 24 extends downwardly as at 25 further defining the connecting side member C. The flat surface of the member B is provided for engagement with a front supporting surface of the hanger bracket but depending on the construction of the hanger bracket such may not be so engageable so that the surfaces 24 or 25 may instead engage a window or frame portion of the side of the automobile.

A horizontal mounting bar D is cantilevered outwardly providing a continuous straight flat upper surface 26 for supporting the hook members 17 of the coat hangers. An inclined bracing member E extends upwardly from a free end of the cantilevered mounting bar generally toward the receptacle A forming a junction therewith and with the connecting side member as at 27.

It is thus seen that the hanger holder assembly is suspended from the vehicle hanger bracket in such a way as to provide a horizontal hanger mounting bar D presenting a continuous straight upper surface for suspending coat hangers therefrom. It will also be noted that the hanger holder assembly is of integral construction being preferably injection molded from a suitable rigid plastic material such as polyethylene.

While a preferred embodiment of the invention has been described using specific terms, such description is for illustrative purposes only, and it is to be understood that changes and variations may be made without departing from the spirit or scope of the following claims.

What is claimed is:

1. A hanger holder assembly for suspending coat hangers carrying garments in an automotive vehicle having a hanger bracket attached to a side of the vehicle above a rear window carrying an upwardly extending post having a longitudinally elongated horizontal cross section on an outwardly spaced base support comprising:

a receptacle for removably positioning said hanger holder assembly upon said upwardly extending post;

an elongated longitudinal opening in one end of said receptacle complementary to said cross section of said upwardly extending post for reception thereupon limiting turning of the hanger holder assembly with respect to said post;

a supporting side member having a surface extending downwardly and inwardly from an outer edge of said receptacle in alignment with said receptacle to facilitate reception of the receptacle upon the post, said surface projecting outwardly for engagement with a supporting surface of said hanger bracket providing support further aiding in limiting turning of said assembly on said post;

a connecting side member having a flat surface formed by an extension of said supporting side member projecting downwardly therefrom;

a horizontal hanger mounting bar cantilevered outwardly from and integral with said connecting side member so as to make said bar accessible for the suspension of coat hangers therefrom;

an inclined bracing member extending upwardly and rearwardly integrally from a free end of said cantilevered hanger mounting bar generally toward said receptacle terminating in an integral junction with said connecting side member and with said outer edge of said receptacle; and said assembly being molded integrally of plastic;

whereby a plurality of coat hangers and garments carried thereby may be suspended in alignment with said side of the vehicle.

2. The structure set forth in claim 1 wherein said receptacle has inwardly tapering sides and a closed top, wherein said mounting bar presents a continuous straight flat upper surface for suspending said coat hangers thereacross, and said surface of said supporting side member is flat engaging an opposed surface of said hanger bracket.

* * * * *